United States Patent Office 3,393,078
Patented July 16, 1968

3,393,078
METHOD OF MAKING AN EMULSION POLISH
AND THE RESULTING PRODUCT
John W. Lockhart, Philadelphia, and Carleton B. Patrick, Springfield, Pa., assignors to E. I. du Pont de Nemours and Company, Wilmington, Del., a corporation of Delaware
No Drawing. Filed Apr. 21, 1966, Ser. No. 544,105
13 Claims. (Cl. 106—8)

This invention relates to a new and useful process for preparing a water-emulsion polish composition. It also relates to a novel polish composition obtainable by this process. This composition is sometimes referred to herein as a "polish."

The polish composition of this invention is especially well adapted for use as a car polish wherein the composition is applied to the painted and chrome surfaces of an automobile, briefly dried, and then wiped or buffed to form a coating of high luster. Car polishes of excellent quality are obtainable in accordance with the present invention which have any desired workable viscosity; for example, the polish viscosity can be either like that of coffee cream (liquid polish) or like that of mayonnaise (paste polish).

In a broad sense, the process of this invention comprises:

(I) Introducing into a vessel the following ingredients:
(A)—About 1 to 15% of a montan wax,
(B)—About 1 to 10% of a microcrystalline wax which is softer than said montan wax,
(C)—About 0.2 to 5.0% of a liquid silicone having a viscosity at 25° C. of about 5,000 to 15,000 centistokes,
(D)—About 1 to 8% of a liquid silicone having a viscosity at 25° C. of about 50 to 500 centistokes,
(E)—About 20 to 55% of a volatile aliphatic hydrocarbon liquid,
(F)—About 5 to 20% of a finely-divided mild abrasive,
(G)—About 10 to 60% of water and
(H)—An effective amount of an emulsifier, all of said percentages being based on the combined weight of said ingredients, at least one of said ingredients (C) and (D) being in the form of an emulsion in water before it is mixed with the other ingredients;

(II) Stirring and heating said ingredients until the wax components (A and B) of the resulting mixtures are dispersed and emulsified as fine molten (or nearly molten) particles, and
(III) Cooling the resulting emulsion composition to room temperature.

In one preferred embodiment of the process, the wax components (A) and (B) are in a finely-divided solid state when they are introduced into the mixing vessel. In another preferred embodiment of the process, the wax components are in a molten state (and then can be preblended with each other) when they are introduced into the mixing vessel. Another useful but not generally preferred manner of practicing the invention comprises introducing the wax components into the mixing vessel in the form of solid pieces, for example, 1-inch thick slabs or nuggets, along with the other ingredients of the composition, and very rapidly stirring the contents of the vessel while heating them until they reach a temperature at least equal to the melting point of the wax components and until the wax components are dispersed and emulsified as fine molten particles.

The water-emulsion polish composition of the present invention is described broadly as the product of mixing and heating under emulsifying conditions the following ingredients:

(A)—About 1 to 15% of a montan wax,
(B)—About 1 to 10% of a microcrystalline wax which is softer than said montan wax,
(C)—About 0.2 to 5.0% of a liquid silicone having a viscosity at 25° C. of about 5,000 to 15,000 centistokes,
(D)—About 1 to 8% of a liquid silicone having a viscosity at 25° C. of about 50 to 500 centistokes,
(E)—About 20 to 55% of a volatile aliphatic hydrocarbon liquid,
(F)—About 5 to 20% of a finely-divided mild abrasive,
(G)—About 10 to 60% of water and
(H)—An emulsifier in an amount effective to provide said emulsion composition with satisfactory storage stability, all of said percentages being based on the combined weight of said ingredients, at least one of said ingredients (C) and (D) being in the form of an emulsion in water before it is mixed with the other ingredients.

The novel polish preferably has an external phase consisting essentially of water, emulsifier and abrasive particles.

The polish of this invention has a montan wax content of about 1 to 15%, preferably about 3.0 to 3.5%. The montan wax is preferably an oxidized type having an acid value of about 90 to 160; an acid value of about 100 to 130 is especially preferred. The oxidized montan wax can also contain ester groups resulting from the esterification of at least part of the acid groups of the wax, for example, with a polyhydric alcohol or a $C_{16}$ to $C_{30}$ monohydric alcohol. It is known that crude or refined montan wax can be oxidized with an acid, for example chromic acid, to provide a modified montan wax having a substantial acid value. It is also known that any predetermined amount of the acid groups of an oxidized montan wax can be esterified with various monohydric and polyhydric alcohols. The resulting wax is sometimes referred to in the art as an esterification product of an oxidation product of montan wax.

It is preferred that at least part of the montan wax is the polish of this invention be in the form of an oxidized montan wax containing morpholine montanate groups resulting from the in situ reaction (during preparation of polish) of at least part of the acid groups of said wax with morpholine.

The polish contains about 1 to 10%, preferably about 1.5 to 2.5%, of a microcrystalline wax which is at least slightly softer, (preferably substantially softer) than the montan wax component at ambient temperatures of about 20 to 30° C. The microcrystalline wax usually has a penetration value at 25° C. of about 2 to 10, preferably about 6 to 8.5. An oxidized microcrystalline wax is usually preferred. In view of the wax content of this polish, it can be referred to as a wax polish.

The polish contains about 0.2 to 5.0%, preferably about 1.0 to 1.5%, of a liquid silicone having a viscosity at 25° C. of about 5,000 to 15,000 centistokes; this high viscosity silicone ingredient preferably has a viscosity of about 8,000 to 12,000 centistokes.

The polish contains about 1 to 8%, preferably about 2 to 4% (dry basis, or water-free basis), of a liquid silicone having a viscosity at 25° C. of about 50 to 500 centistokes; this low viscosity silicone ingredient preferably has a viscosity of about 80 to 120 centistokes.

Silicone ingredients (C) and (D) are polyorganosiloxanes in the form of nonvolatile liquids; they are preferably polydialkylsiloxanes and still more preferably polydimethylsiloxanes. At least one of the silicone ingredients (C) and (D) is prepared in the form of an emulsion in water with the aid of a suitable emulsifier before it is mixed with the other ingredients. This results in a polish containing dispersed particles of silicone (C) and separate dispersed particles of silicone (D). Preferably only the low viscosity silicone (ingredient D) is added as an aqueous emulsion, the silicone content of the emulsion typically being about 20 to 40% and the emulsifier content being about 2 to 4%.

The polish contains about 20 to 55% of a volatile aliphatic hydrocarbon liquid (ingredient E), preferably a blend of deodorized kerosene and mineral spirits. When manufacturing a paste-type car polish according to the present invention, the ingredient (E) content preferably consists essentially of about 5 to 7% deodorized kerosene having a B.R. (boiling range) of about 170 to 272° C., about 28 to 32% heavy mineral spirits having a B.R. of about 177 to 205° C. and about 10 to 12% light mineral spirits having a B.R. of about 142 to 170° C. In a liquid-type car polish, the ingredient (E) content preferably consists essentially of about 5 to 7% deodorized kerosene and about 20 to 23% of light mineral spirits.

Other volatile organic liquids, for example aromatic hydrocarbons, can also be present in the polish in an amount that is not unduly harmful to the surface being polished and to the person using the polish.

A finely-divided mild abrasive is present in the polish in an amount equal to about 5 to 20%, preferably about 8 to 18%, based on the weight of the polish composition. This ingredient is preferably a kaolin-type aluminum silicate abrasive; however, other known mild abrasives can also be used which are not harmful to the surface to be polished. When preparing a paste-type car polish, the abrasive is preferably an oleophilic type which is mixed with at least part of the volatile hydrocarbon (ingredient E) before it is mixed with the other ingredients. When preparing a liquid-type car polish, the abrasive is preferably introduced into the mixing vessel as a hydrophilic dry powder.

An emulsifier is added to the mixing vessel in an amount effective to facilitate the formation of the emulsion as well as to provide the emulsion composition with satisfactory storage stability. A major proportion of the emulsifier present in the polish preferably consists of the product of the in situ reaction (during preparation of the polish) between (a) an amine selected from morpholine-2-amno-2-methyl-1-propanol and methoxypropylamine and (b) a fatty acid selected from oleic acid, stearic acid and montanic acid. In a particularly preferred manner of practicing the invention, morpholine (e.g., about 0.7%), oleic acid (e.g., about 1%) and an oxidized montan wax (e.g., about 3.2%) containing acid groups (montanic acid) are among the ingredients added to the mixing vessel; and during the preparation of the polish the morpholine reacts (in situ) with the oleic acid and the acid groups of the montan wax, thereby forming the emulsifier components morpholine oleate and morpholine montanate.

The polish contains about 10 to 60%, preferably about 21 to 55%, of water; this total value includes the water present in the silicone emulsion. Additional water can be added if desired just prior to use of the polish in an amount that does not render the polish unsatisfactory for the particular application. The water content of a liquid car polish according to the present invention is preferably about 46 to 55% and that of a paste car polish is preferably about 21 to 30%.

In practicing the process of the invention, all of the ingredients can be added to the mixing vessel at substantially the same time, followed by the required stirring and heating to form the emulsion. Alternatively, the ingredients can be added one after the other in rapid sequence in any desired order while operating the mixer and the heater. It is unexpected that car polishes of excellent quality are obtainable in this manner.

In a preferred manner of practicing the novel process: (1) all of the ingredients as described above are introduced into a vessel equipped with a stirrer and a heater; (2) an emulsion is formed by heating the contents of the vessel to an elevated temperature (e.g., about 90° C.) while stirring them under high shear (e.g., by operating a 6-inch diameter stirrer at 550 r.p.m. in a 2-gallon vessel whose inside diameter is about 8.5 inches); (3) the resulting emulsion is kept at an elevated temperature (e.g., at about 90° C.) for a while (e.g., about 15 minutes) without stirring; (4) the emulsion is then stirred rapidly (e.g., about 550 r.p.m.) while it is cooled to a temperature below the melting point of the waxes (e.g., 52° C.); and (5) the emulsion is stirred slowly (e.g., about 100 to 200 r.p.m.) while it is allowed to flow from an outlet in the wall of the vessel into the containers in which the polish product is to be sold.

Polish compositions of the present invention can be applied with a soft cloth or other applicator to the painted exterior and interior surfaces of automobiles and other articles and, after a brief drying period, wiped or buffed with a soft cloth to form a protective coating of high luster. The polish applies easily and buffs easily. Unless the painted surface is in unusually bad condition, surprisingly little effort is required to obtain a very glossy finish. Moreover, excellent results can be obtained when the drying period between application and buffing is relatively short (e.g., about 2 minutes) or relatively long (e.g., about 20 minutes); thus the polish has a very desirable working life.

The examples which follow are given for the purpose of illustrating the invention. All quantities shown are on a weight basis unless otherwise indicated.

EXAMPLE 1

A paste-type car polish is prepared from the ingredients shown in Formula P:

Formula P

| Ingredient: | Parts |
|---|---|
| (A)—Montan wax | 3.2 |
| (B)—Microcrystalline wax | 2.0 |
| (C)—High viscosity silicone | 1.3 |
| (D)—Low viscosity silicone, aqueous emulsion | 9.0 |
| (E)—Aliphatic hydrocarbons | 46.8 |
| (F)—Aluminum silicate abrasive | 15.0 |
| (G)—Water | 21.0 |
| (H)—Emulsifier | 1.7 |
| | 100.0 |

In Formula P, ingredient (A) is an oxidized montan wax (Hoechst Wax LP) having a melting point of 81 to 84° C., an acid value of 105 to 125, a saponification value of 135 to 155 and a penetration value at 25° C. of 1; ingredient (B) is an oxidized microcrystalline wax (Petrolite C-36) having a M.P. of 82° C., and a penetration value of 8 at 25° C.; ingredients (A) and (B) are in the form of particles having a diameter of not over ⅛ inch; ingredient (C) is a liquid polydimethylsiloxane ("Viscasil" 10,000) having a viscosity at 25° C. of about 10,000 centistokes, ingredient (D) is a silicone emulsion (General Electric SM-2033) prepared by emulsifying 3.15 parts of a liquid polydimethylsiloxane having a viscosity at 25° C. of 100 centistokes in 5.85 parts water with the aid of 3% of an emulsifier based on the weight of the emulsion; ingredient (E) is a mixture of 6.0 parts deodorized kerosene having a B.R. of 171 to 271° C., 30.0 parts heavy mineral spirits having a B.R. of 175 to 205° C. and 10.8 parts light mineral spirits having a B.R. of 143 to 169° C.; ingredient (F), which is an oleophilic kaolin-type aluminum silicate abrasive ("Kaopolite" SF-0), is mixed with ingredient (E) before it is added to the vessel in which the polish is prepared; ingredient (H) consists of 1.0 part oleic acid and 0.7 part morpholine.

The car polish of Formula P is prepared by (1) introducing all of the ingredients described above into a stainless steel vessel equipped with a heating jacket and stirrer, (2) heating the contents of the vessel to 90° C. while stirring rapidly (550 r.p.m.); (3) without stirring, keeping the resulting emulsion at 90° C. for 15 minutes, (4) with rapid stirring, cooling the emulsion to 52° C., and (5) with slow stirring, pouring the emulsion into the containers in which the polish product will be sold.

During the preparation of the polish, the morpholine reacts (in situ) with the oleic acid and the acid groups of the montan wax; thus the product contains morpholine oleate and morpholine montanate as effective emulsifier components. Unexpectedly, a car polish of excellent quality is obtained by the process described in this example. The process is simple, inexpensive and efficient.

The product of Example 1 is useful for polishing automobiles and the like in the manner previously described. The polish has a viscosity similar to that of mayonnaise; it is easy to apply and easy to buff to a high luster during a working life of about 2 to 20 minutes.

An automobile is polished with the product of Example 1 by (1) applying the polish with a damp flannel cloth to the painted surfaces of the automobile using circular overlapping strokes, (2) letting the polish composition dry for 5 minutes, and (3) lightly buffing the polish-coated areas with a clean, dry flannel cloth. The polish applies easily and buffs easily to a high luster.

Five additional automobiles are polished in the same manner except the drying time between applying and buffing the polish is as shown in Table I:

Table I

| Automobile No.: | Drying time in minutes |
|---|---|
| 1 | 2 |
| 2 | 7 |
| 3 | 12 |
| 4 | 17 |
| 5 | 20 |

Each of the five automobiles is easily buffed to a high luster.

When Example 1 is repeated except the wax ingredients (A) and (B) are melted together in the stainless steel vessel before the other ingredients are added, a polish product is obtained having a higher viscosity than the product of Example 1 and having similar utility.

EXAMPLE 2

A liquid-type car polish is prepared from the ingredients shown under Formula L.

Formula L

| Ingredient: | Parts |
|---|---|
| (A)—Montan wax | 3.2 |
| (B)—Microcrystalline wax | 2.0 |
| (C)—High viscosity silicone | 1.2 |
| (D)—Low viscosity silicone, aqueous emulsion | 9.0 |
| (E)—Aliphatic hydrocarbons | 27.4 |
| (F)—Aluminum silicate abrasive | 11.0 |
| (G)—Water | 44.5 |
| (H)—Emulsifier | 1.7 |
| | 100.0 |

The ingredients used in Formula L are the same as in Formula P except (a) ingredients (A) and (B) are melted together in a separate vessel and added to the vessel in which the polish is prepared in molten form instead of particulate form, (b) ingredient (E) is a mixture of 6.0 parts deodorized kerosene and 21.4 parts light mineral spirits, B.R. 143 to 169° C.; (c) ingredient (F) is a hydrophilic aluminum silicate abrasive ("Kaopolite" SF) which is added to the mixing vessel as a dry powder instead of being premixed with the aliphatic hydrocarbon component.

The car polish of Formula L is prepared by the heating and mixing method described in Example 1. The product of Example 2 has a viscosity and appearance similar to that of coffee cream and its utility is similar to that of Example 1. It has satisfactory storage stability, and it is still useful after being subjected to several freeze/thaw cycles.

The product of Example 2 is still useful as a car polish even when additional water is added just before use; for example, when 1 part of the polish is diluted with 2 parts of water, the resulting mixture can be used to obtain a good luster on automobiles whose finish is in reasonably good condition.

We claim:
1. A process for preparing a water-emulsion polish composition comprising:
(I) introducing into a vessel the following ingredients:
(A) about 1 to 15% of a montan wax,
(B) about 1 to 10% of a microcrystalline wax which is softer than said montan wax,
(C) about 0.2 to 5.0% of a liquid silicone having a viscosity at 25° C. of about 5,000 to 15,000 centistokes,
(D) about 1 to 8% of a liquid silicone having a viscosity at 25° C. of about 50 to 500 centistokes,
(E) about 20 to 55% of a volatile aliphatic hydrocarbon liquid,
(F) about 5 to 20% of a finely-divided mild abrasive,
(G) about 10 to 60% of water, and
(H) an emulsifier,
all of said percentages being based on the combined weight of said ingredients, at least one of said ingredients (C) and (D) being in the form of an emulsion in water before it is mixed with the other ingredients,
(II) stirring and heating said ingredients until the wax components (A and B) of the resulting mixture are dispersed and emulsified as fine molten particles, and
(III) cooling the resulting emulsion composition to room temperature.

2. A process according to claim 1 wherein the wax components (A) and (B) are in a finely-divided solid state when introduced into the vessel.

3. A process according to claim 1 wherein the wax components (A) and (B) are in a molten state when introduced into the vessel.

4. A process according to claim 1 wherein the abrasive component (F) is mixed with at least part of the volatile hydrocarbon component (E) before it is introduced into the vessel.

5. A water-emulsion polish composition, comprising the following ingredients:
(A) about 1 to 15% of a montan wax,
(B) about 1 to 10% of a microcrystalline wax which is softer than said montan wax,
(C) about 0.2 to 5.0% of a liquid silicone having a viscosity at 25° C. of 5,000 to 15,000 centistokes,
(D) about 1 to 8% of a liquid silicone having a viscosity at 25° C. of about 50 to 500 centistokes,
(E) about 20 to 55% of a volatile aliphatic hydrocarbon liquid,
(F) about 5 to 20% of a finely-divided mild abrasive,
(G) about 10 to 60% of water and
(H) an emulsifier in an amount sufficient to provide said emulsion composition with satisfactory storage stability,
all of said percentages being based on the combined weight of said ingredients, at least one of said ingredients (C) and (D) being in the form of an emulsion in water before it is mixed with the other ingredients.

6. A composition according to claim 5 which has an external aqueous phase consisting essentially of said ingredients (F), (G) and (H).

7. A composition according to claim 5 wherein ingredient (A) is an oxidized montan wax having an acid value of about 90 to 160.

8. A composition according to claim 5 wherein ingredient (A) is an oxidized montan wax containing ester groups resulting from the esterification of at least part of the acid groups of said wax.

9. A composition according to claim 5 wherein at least part of ingredient (A) is present in the composition in the form of an oxidized montan wax containing morpholine montanate groups resulting from the in situ reaction of at least part of the acid groups of said wax with morpholine.

10. A composition according to claim 5 wherein the silicone of ingredients (C) and (D) is a liquid polydimethylsiloxane.

11. A composition according to claim 5 wherein ingredient (F) is aluminum silicate.

12. A composition according to claim 5 wherein the emulsifier present in the composition comprises the product of the in situ reaction between (a) an amine selected from the group consisting of morpholine, 2-amino-2-methyl-1-propanol and methoxypropylamine and (b) a fatty acid selected from oleic acid, stearic acid and montanic acid.

13. A water-emulsion polish composition, comprising the following ingredients:
(A) about 3.0 to 3.5% of a montan wax having an acid value of about 100 to 130,
(B) about 1.5 to 2.5% of a microcrystalline wax which is softer than said montan wax,
(C) about 1.0 to 1.5% of a liquid polydimethylsiloxane having a viscosity at 25° C. of about 8,000 to 12,000 centistokes,
(D) about 2 to 4% (dry basis) of an emulsion in water of a polydimethylsiloxane having a viscosity at 25° C. of about 80 to 120 centistokes,
(E) about 20 to 55% of a volatile aliphatic hydrocarbon liquid,
(F) about 8 to 18% of a finely-divided aluminum silicate mild abrasive,
(G) about 21 to 55% of water and
(H) an emulsifier in an amount sufficient to provide said emulsion composition with satisfactory storage stability, said emulsifier being the product of the in situ reaction between (a) an amine selected from the group consisting of morpholine, 2-amino-2-methyl-1-propanol and methoxypropylamine and (b) a fatty acid selected from the group consisting of oleic acid, stearic acid and montanic acid, all of said percentages being based on the combined weight of said ingredients, the aqueous phase of said composition being the external phase.

No references cited.

DONALD J. ARNOLD, *Primary Examiner.*